Jan. 30, 1968  Y. E. STAHLER  3,366,954
SPECTROGRAPHICAL RANGE FINDER
Filed Nov. 4, 1966  7 Sheets-Sheet 1
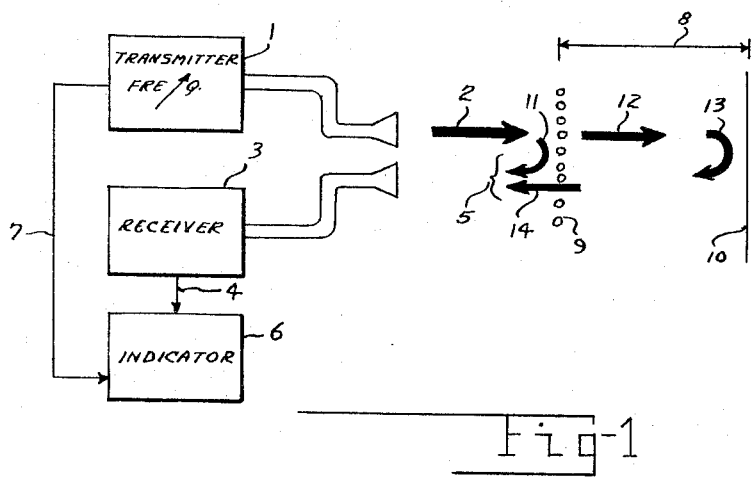
Fig-1
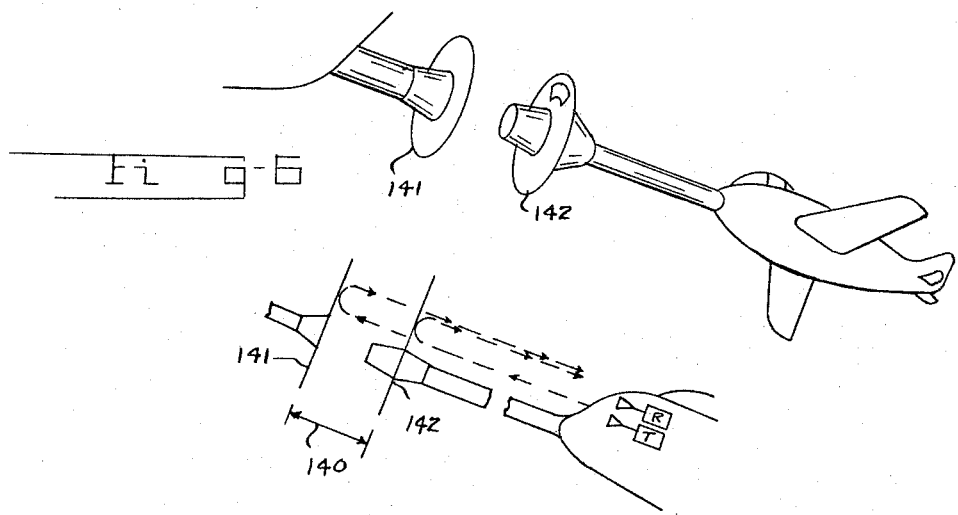
Fig-6
Fig-7
INVENTOR.
YLO E. STAHLER
BY Harry A. Herbert Jr.
Robert Kerr Duncan
ATTORNEYS

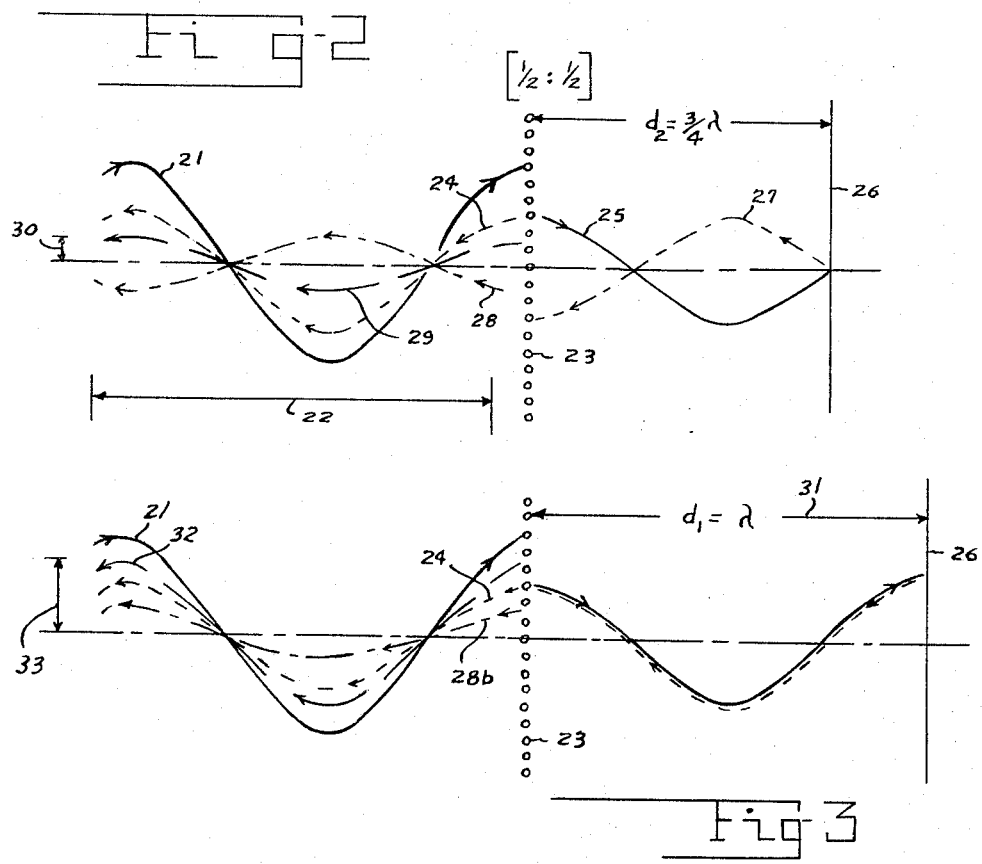
Fig-2
Fig-3
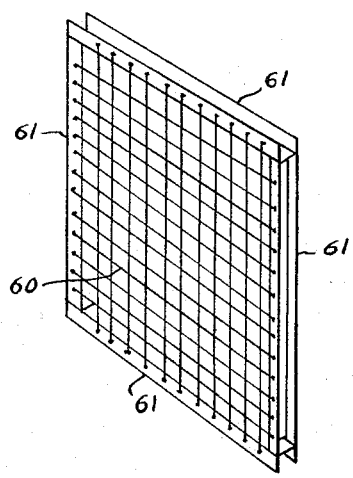
Fig-8

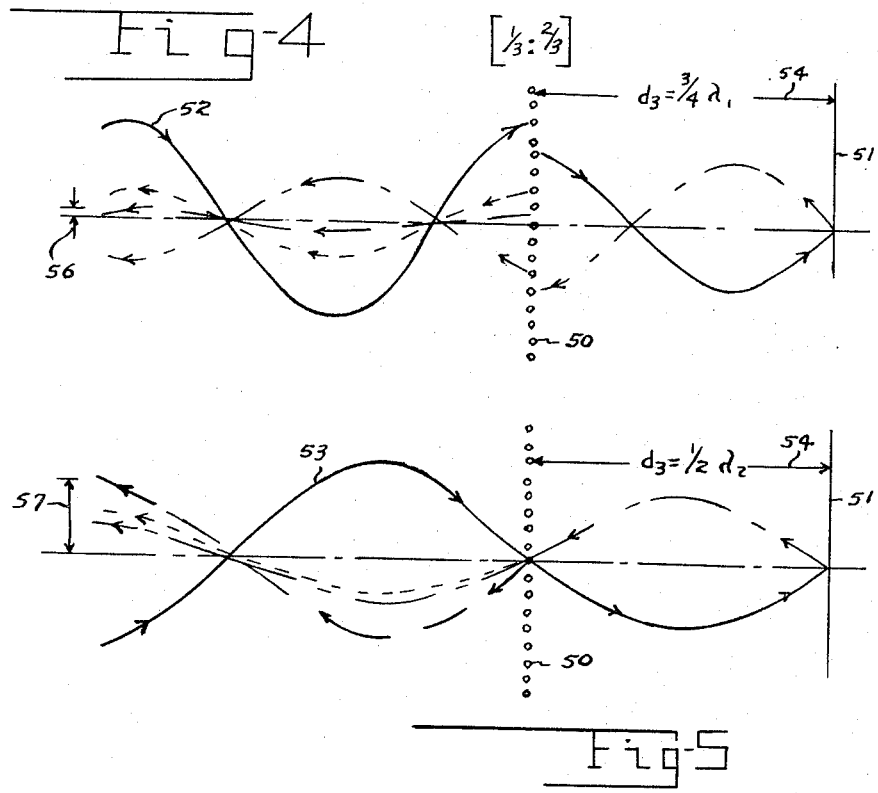
Fig-4
Fig-5
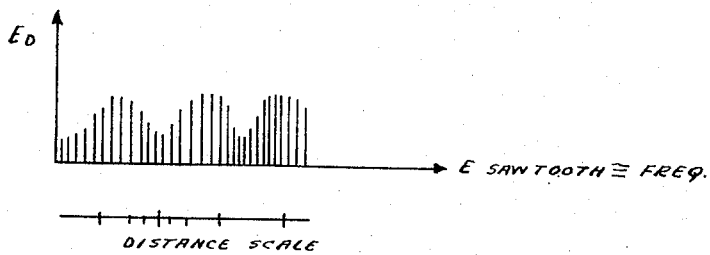
Fig-10

United States Patent Office 3,366,954
Patented Jan. 30, 1968

3,366,954
SPECTROGRAPHICAL RANGE FINDER
Ylo E. Stahler, Dayton, Ohio, assignor to the United States of America as represented by the Secretary of the Air Force
Filed Nov. 4, 1966, Ser. No. 592,693
8 Claims. (Cl. 343—12)

ABSTRACT OF THE DISCLOSURE

A distance measuring apparatus that provides on an oscilloscope, or by a level indicating meter, the correlation of the frequency of transmission of an electromagnetic wave with the phase relationships of the reflected energies of the reflections of the electromagnetic wave from a partially reflecting wire grid and from a distant object. The frequency separation of the successive maxima and minima of the combined reflected energies is a measure of the distance between the partially reflecting wire grid and the distant object.

---

The invention described herein may be manufactured and used by or for the Government for governmental purposes without the payment to me of any royalty thereon.

This invention relates to distance measuring apparatus, and more particularly to electromagnetic wave apparatus for measuring distances between a reference location and a remote object in which both are physically separate from the source of electromagnetic radiation.

The use of radar for measuring distances is well known. Two types of radar signals are commonly used; pulse systems, wherein short bursts or pulses of high frequency energy are periodically radiated and the range determined as a function of the time interval measured from the initiation of the pulse until the echo is received; and continuous wave frequency modulated systems, wherein the instantaneous frequency is cyclically varied and the range of reflecting objects is measured as a function of the difference in phase or frequency between the modulation of the transmitted energy and the reflected energy. In both of these systems the distance that is measured is that distance from the source of radiation to the echo producing target. In order to obtain the separation distance of two objects one range has to be subtracted from the other. Generally pulse type systems are more suitable for long range, rather coarse, measurements. It may readily be observed that in pulse systems employing pulses as short as one microsecond that the shortest range at which echoes could be detected is approximately 500 feet. Also, two separate targets having a separation of less than this amount will be detected as one composite target.

Continuous wave frequency modulation radar systems are better suitable for relatively short ranges, but they have the limitation in that it is quite difficult to distinguish between different reflecting objects, because the predominate echo masks or covers up minor echoes. For this reason such systems find their principal use in radio altimeters for aircraft in which the only important reflecting object is the surface of the earth.

The accurate determination from a distance, of relatively short, remote distances, particularly when it is not feasible to locate an electromagnetic radiating device, such as an antenna or horn, at one of the locations has heretofore been a serious problem. Even then, it is quite difficult to determine without ambiguities, the reference point to which the measurement is made. Such situations may arise for instance in maneuvering a refueling nozzle into the fuel receiving socket during in-flight refueling, in satellite docking operations, in airborne catch-and-retrieve operations, in close formation flying, in collision avoidance, and in aircraft landing operations.

This invention relates specifically to an electromagnetic wave system having a partially reflective element positioned between the source of radiation and a reflecting object and means for determining the distance between the partially reflective element and the reflecting object by the existing spectral wave characteristics. It pertains to systems throughout the electromagnetic spectrum.

Accordingly, it is an object of the invention to provide a system for measuring the distance between two objects from a remote location.

Another object of the invention is to provide a system for measuring distances between a reference point and a remote object in which the reference point is more accurately determined than in prior systems.

Another object of the invention is to provide a system for remotely measuring very small distances with a high degree of accuracy.

Another object of the invention is to provide a system for measuring distant in inaccessible locations.

Another object of the invention is to provide an electromagnetic wave system, for measuring distances, that is relatively independent of change in the phase shift of the reflected wave due to different reflecting substances.

Another object of the invention is to provide an electromagnetic wave system, for measuring distances, that is relatively independent of changes in the phase shift of the reflected wave due to the angle of incidence of the impinging electromagnetic wave.

A further object of the invention is to provide a novel and improved method and a novel and improved system of measuring distance.

These and other objects, advantages, and novel features of the invention will be more apparent from the following description, when read in connection with the drawing, in which FIG. 1 is a simplified block diagram of the invention setting forth the major principles of operation.

FIG. 2 is a wave plot of a particular frequency of radiation depicting the relationships of wavelengths of electromagnetic waves with the distance between a partially transparent member and a reflecting surface.

FIG. 3 is a wave plot depicting the relationships of wavelengths of electromagnetic waves with the same conditions of FIG. 2 except that the distance to the reflecting surface has been increased.

FIG. 4 is a wave plot depicting the relationships of wavelengths of electromagnetic waves with a particular distance between a partially transparent member and a reflecting surface.

FIG. 5 is a wave plot depicting the relationships of wavelengths of electromagnetic waves with the same conditions of FIG. 4 except that the frequency of the electromagnetic radiation has been decreased.

FIG. 6 is a representative pictorial view showing an embodiment of the invention as used in docking operations for refueling.

3

FIG. 7 is a representative schematic drawing of the operation represented by FIG. 6.

FIG. 8 is a pictorial view of a partially transparent element for eletcromagnetic radiation in the radio part of the spectrum.

Figure 9:
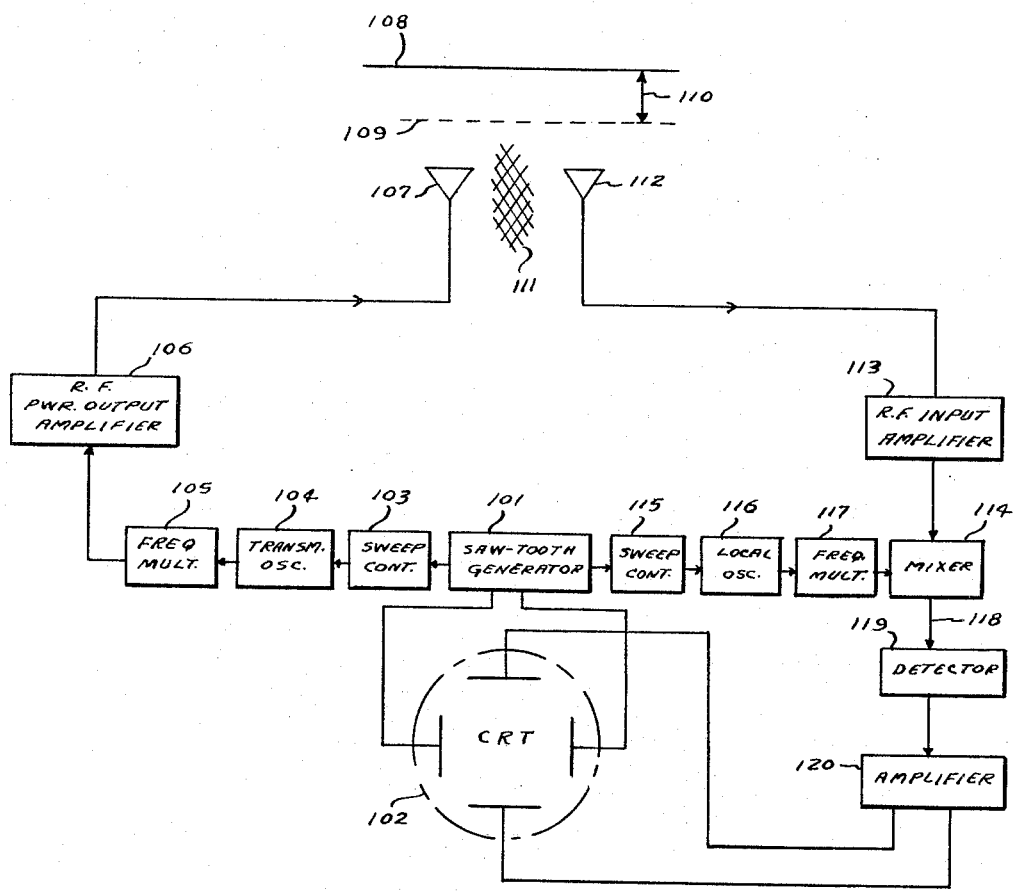

FIG. 9 is a detailed block diagram of an embodiment of the invention.

FIG. 10 is a representative pictorial view of a distance indication on the embodiment of FIG. 9.

Figure 11:
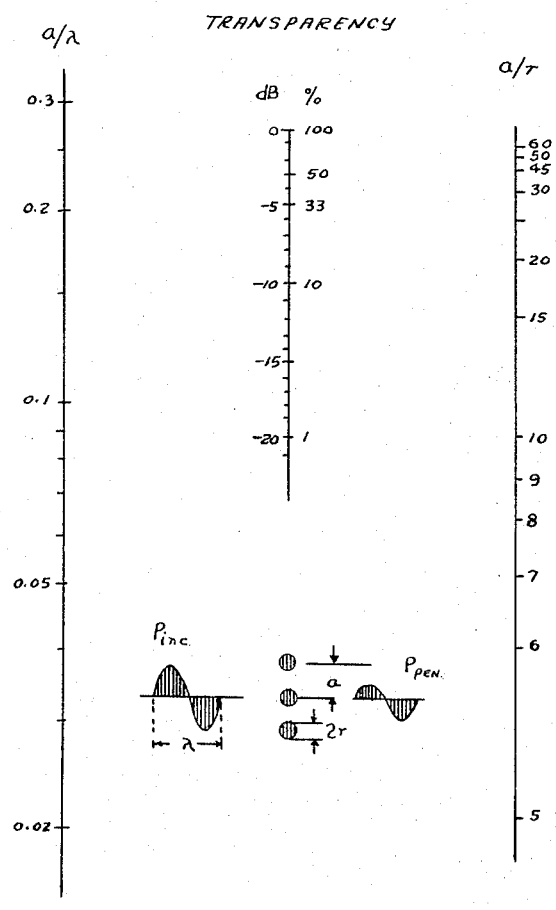

FIG. 11 is a nomograph that may be used in the construction of wire grid partially reflecting elements.

Figure 12:
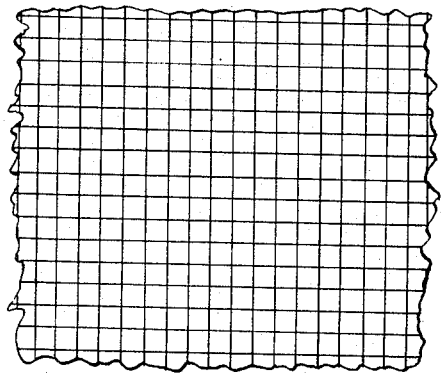

FIG. 12 is a pictorial view of a wire grid partially reflecting element.

Figure 13:
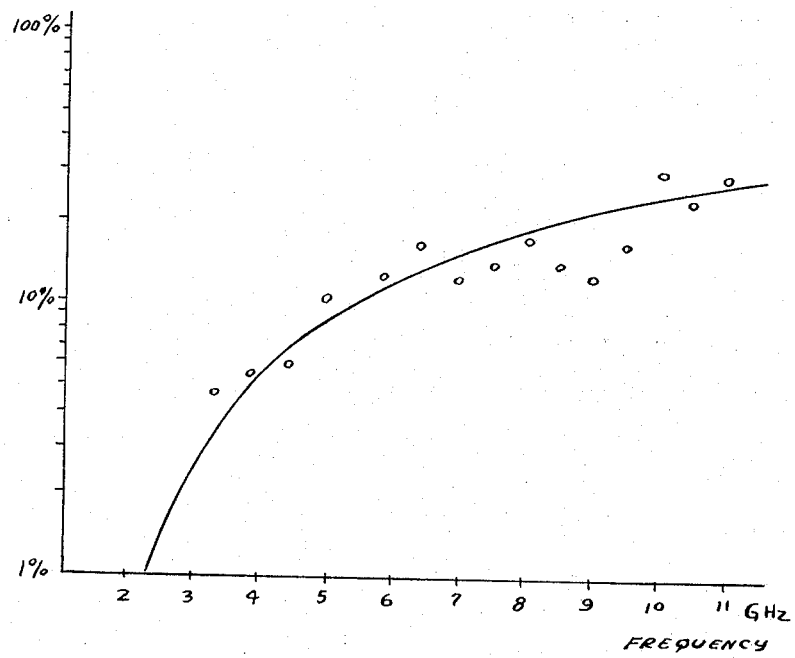

FIG. 13 is a plot of the transparency characteristics vs. frequency of the element of FIG. 12.

Figure 14:
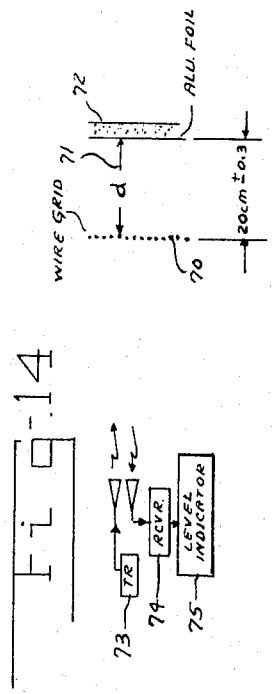

FIG. 14 is a simplified diagram of an operating embodiment of the invention.

Figure 15:
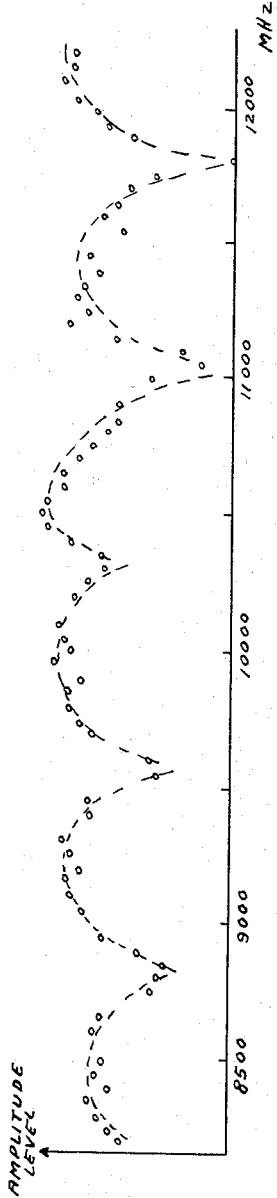

FIG. 15 is a plot of the operating characteristics of an embodiment of the invention shown in FIG. 14.

Referring to FIG. 1 a conventional source of electromagnetic radiation 1 having a controlled variable frequency of oscillation is used to generate and radiate a continuous wave of energy 2 in the direction of partially reflective element 9 and reflecting object 10. A conventional receiver, or detector, 3 is used to furnish an output signal voltage 4 proportional to the returning electromagnetic radiation 5. The amplitude of this voltage is displayed on the indicator 5 which may be a conventional cathode-ray oscilloscope having the display sweep synchronized with the controlled variable frequency sweep of the transmitter. (Connection 7 supplies the synchronization voltage to the indicator.) The embodiment of the invention shown in FIG. 1 provides a system for measuring the distance 8 between the partially reflecting element 9 and the reflecting surface 10. The partially reflecting element, may sometimes be termed "partially transparent" or "semitransparent." As will be further detailed later, the degree of transparency, or the ratio of the amount of energy reflected from the partially reflecting element to the amount of energy permitted to propagate on through, may be adjusted advantageously to the operation of the invention. It is to be understood that the location of the partially reflecting element 9 may be at a known and controlled location in the practice of the invention, but this is not necessary. It is the determination of the distance 8 from the element 9 (which may be considered the reference point for the distance measurement) to the unknown location of object 10, that this embodiment of the invention provides.

The theory of the invention may best be understood by considering the simplified block diagram of the embodiment of the invention shown in FIG. 1 along with the wave diagrams of FIGS. 2, 3, 4, and 5. In FIG. 1 the wave train of continuous energy represented by the arrow 2 encounters the partially reflective element 9. Part of the energy is reflected 11, and part passes on through 12. This portion of the energy 12 propagates on through space until it strikes object 10 where an appreciable portion is reflected as represented by arrow 13. This reflected energy, 13, propagates back through element 9, as represented by arrow 14 and combines with the energy 11 being reflected from element 9. The combined energy 5 is that detected by the receiver 3. Of course, energy losses may occur at element 9, the object 10, in propagation, and in addition, in reflections back toward object 10 from element 9.

It will become apparent that the characteristics of the detected, combined wave 5 will be dependent upon the phase relationship existing between the two waves 11 and 14, after considering the exemplary wave plots of FIGS. 2, 3, 4, and 5. Assuming an instantaneous frequency of transmission (or for the moment, that the frequency of transmitter 1 is fixed), the energy 2 may be represented by wave 21 having such a frequency that its wavelength is represented by length 22. The partially reflective element 9 is reprsented by a specific partially reflective element 23

4 that has the characteristics of reflecting without phase shift half the energy impinging upon it, 24, and transmitting (or permitting to pass) on through the remaining half of the energy content, without phase shift 25. Note that the reflected wave 24 and the continuing wave 25 have one-half the energy amplitude of the transmitted wave 21. Also note that it is assumed that no phase shifts have taken place. Wave 25 upon encountering object 26 is reflected, assumed without attenuation and without phase shift as wave 27. Wave 27 upon encountering partially reflective element 23 propagates one-half its energy through element 23 represented by wave 28. That portion of wave 27 reflected back toward object 26 is not shown and may be disregarded. This wave 28 returning toward the receiver combines with wave 24 and the receiver detects the summation of the two waves. Since, in this particular illustration wave 24 and wave 28 are 180 degrees out of phase, the resultant wave that the receiver detects may be represented by wave 29 having an energy content represented by the amplitude 30 of the wave. It will be explained later how shifts in phase (except that occurring in the wave due to the propagation distance from the partially reflecting element to the object and return), which will generally occur, will be insignificant to the operation of the invention, how the ratio of reflectibility to transmissibility may be optiminally determined, and how to construct the partially reflective element.

FIG. 3 shows the wave conditions when the reflecting object 26 is located one wavelength 31 away from the partially reflecting element 23 instead of ¾ wavelength as in FIG. 2. Here the reflected wave 28b, from the object that has penetrated the partially reflective elements is in phase with the wave 24 reflected from element 23. The two waves 24 and 28b thus combine and the receiver detects a wave of equivalent energy content represented by wave 32 having an amplitude represented by height 33. It may thus be observed that for the specific conditions of frequency and reflectivity set forth in FIGS. 2 and 3 that FIG. 2 represents a minimum and FIG. 3 represents a maximum in the received signals and that minimums will occur when the reflecting object 26 is spaced at odd multiples of quarter wavelengths from the partially reflecting element, 23, and that maximums will occur at all even multiples of quarter wavelengths.

In FIGS. 4 and 5 the partially reflecting element 50 has been so constructed that ⅔ of the energy impinging on it passes on through and ⅓ of the energy is reflected. The physical distance of the reflecting object 51 from the partially reflecting element has been kept constant; but the frequency of the transmitted wave 52 of FIG. 4 has been decreased in FIG. 5 to that represented by wave 53. This change in frequency necessarily changes the magnitude of the number of wavelengths existing over the fixed distance from the partially reflecting element to the reflecting object. Thus this distance 54 in FIG. 4 is ¾ of wavelength $\lambda_1$ (for frequency $f_1$) and in FIG. 5 it is ½ of wavelength $\lambda_2$ (for frequency $f_2$). It is to be observed that the received signal changed from a minimum, represented by amplitude 56, to a maximum return, represented by amplitude 57, in the changing of the frequency of the transmitted wave such that the wavelength changed by ¼ wavelength over the distance to be measured. It is thus to be observed that as the frequency is varied the received energy, for a fixed distance between the partially reflective element and the reflecting object, will be a minimum when this distance is an odd multiple of quarter wavelengths and a maximum when this distance is an even number of quarter wavelengths.

Mathematically expressed, the operation of this invention may be understood by considering the following relationships. Let the frequency of transmission, $f$, be varied such that maximums and minimums occur in the received signal. As previously shown, the maximums will occur when an even multiple of quarter wavelengths exist over the distance, $d$, between the partially reflecting element and the reflecting object, and minimums will occur when an odd multiple of quater wavelengths exist over the distance, $d$, between the partially reflecting element and the reflecting object.

Where N is any number of a series of consecutive whole number integers 1, 2, 3, 4, etc., 2N represents any number of another series of even numbers 2, 4, 6, etc., and 2N−1 represents a series of odd numbers 1, 3, 5, etc. For any specific even value represented by 2N, 2N−1 represents the next lower odd value. Thus $2N/4$ represents an even number of quarters and $$\frac{2N-1}{4}$$

represents an odd number of quarters. Taking a frequency $f_1$, at which a maximum return was received, indicating an even number of quarter wavelengths existed, and $f_2$ the next following lower frequency at which a minimum return was received, indicating an odd number of quarter wavelengths, then:

$$\frac{2N}{4}\lambda_1 = d$$

for maximum return and $$\frac{2N-1}{4}\lambda_2 = d$$

for minimum return where $\lambda_1$ = wavelength of frequency $f_1$
$\lambda_2$ = wavelength of frequency $f_2$ and $d$ = distance between the partial reflecting element and the reflecting object.

Rewriting the foregoing expressions by substituting the known relationship between wavelength and frequency, i.e., $\lambda = c/f$ where $c$ = velocity of propagation of electromagnetic radiation
$f$ = frequency in cycles per second (hertz) and
$\lambda$ = wavelength then $$\lambda_1 = c/f_1 \text{ and } \lambda_2 = c/f_2$$

$$\frac{2N}{4}\lambda_1 = d \text{ becomes } \frac{2N}{4}\frac{c}{f_1} = d$$

and $$\frac{2N-1}{4}\lambda_2 = d \text{ becomes } \frac{2N-1}{4}\frac{c}{f_2} = d$$

Solving each expression for $f$, $$f_1 = \frac{2Nc}{4d}$$

$$f_2 = \frac{(2N-1)c}{4d} = \frac{2Nc - c}{4d}$$

subtracting $f_2$ from $f_1$ to obtain the incremental change $\Delta f$ $$f_1 - f_2 = \frac{2Nc - 2Nc + c}{4d} = \Delta f$$

thus, $$\Delta f = c/4d$$

or, $$d = c/4\Delta f$$

It now follows that the distance is solely defined by the frequency separation between successive maximum and minimum returns and for a given distance this separation is constant and independent of the magnitude of the frequency used, only the shift in frequency from a maximum to a minimum (or minimum to a maximum) being important.

Some representative values of the frequency shift for the measurement of distance are:

| Distance: | | $\Delta$ frequency |
|---|---|---|
| 1 mm. | gHz | 75 |
| 1 cm. | gHz | 7.5 |
| 1 m. | mHz | 75 |
| 1 km. | kHz | 75 |
| 100 km. | Hz | 750 |

Thus, very small, to extremely large, distances may be determined to a very high degree of accuracy, the accuracy being limited only by the capability to resolve the frequency separation between the maximum and the minimum return.

In some embodiments of this invention it may be more convenient, and thus desirable, to detect the frequency separation between two adjacent minima, in which case twice the value of frequency shift would be required to indicate the same measure of distance.

The prior statement has been made that shifts in the phase of the electromagnetic wave, other than that occasioned by the distance being determined, have a negligible effect on the operation of this invention. Those skilled in the art readily know that the phase of a reflected electromagnetic wave will vary, with respect to the impinging electromagnetic wave, dependent upon the composition of the material from which the reflection takes place, upon the angle of incidence of the impinging wave, and also upon the frequency of the wave. Thus the phase of a reflected wave from a wooden object may be quite different from that reflected from a metal object, and the phase of a returning wave having impinged at 90° will be different from one having struck the object at 60°. Also the phase of a returning 10 gHz. wave will be different from that of a 10 mHz. wave. As this invention operates by using an incremental frequency shift, and over the incremental range of frequencies used between a maximum and a minimum the change in the shift in phase is essentially constant, the effects of these phase shifts on the operation of this invention are negligible. For instance in one embodiment of this invention using a wire grid partially reflective element and having a metallic plate as the reflective object, and using an electromagnetic radiation at approximately 10 gHz., the shift in frequency between maximum and minimum returns was approximately 75 mHz. when the separation was one meter. The frequency of radiation was thus changed from approximately 10,000,000,000 cycles per second, to 10,075,000,000 cycles per second, or less than one percent. Thus, even though the wave suffered large phase shifts at the partially reflecting element or at the object, the change in phase shift over the less-than-one-percent frequency change was negligible, and the accuracy of determination of the distance was not impaired.

In order to maintain the effects of phase shift at a negligible amount it is desirable that the magnitude of the frequency shift used in determining adjacent maximum and minimum responses, or adjacent maximums or minimums, be a decade or more removed from the nominal frequency of radiation, e.g., 10 kHz. frequency shift for 100 kHz. nominal radiated signal.

The partially reflective element used in this system may be constructed by using a wire mesh grid 60 as shown mounted on a channel frame member 61 in FIG. 8. Other materials that reflect an appreciable portion of the electromagnetic radiation impinging thereon and pass an appreciable portion, may be used. The particular use to which this invention is put will be largely determinative of the material used for this element. An open wire grid has been previously mentioned, a fused quartz window, a wire grid embedded in ceramic foam, a layer of either silica, alumina, or titanium dioxide attached to, or deposited on a slab of ceramic foam, are other examples of materials that may be used. In practicing this invention it is recognized that those skilled in the art will be able to select the material for the partially reflective element dependent upon the environment in which the invention is used.

It has been pointed out that the ratio of reflectivity to transparency of the partially reflective element may be adjusted to increase the ratio of the maximum to the minimum. It is apparent that generally it will be desirable that a greater amount of energy be passed through than is reflected. For optimum ease of detecting maximums and minimums, when measuring distances to a specific object, this ratio of reflectivity to transparency may best be determined empirically, particularly when the reflectivity characteristics are unknown of the reflecting object to which it is desired to obtain the distance. If it is desired to measure the distance to various objects, having different reflective characteristics, using x-band frequencies, an open wire grid partially reflective element having square mesh approximately composed of 5 mil wire at 0.2 inch spacing has been found very suitable for general usage.

It has been found that when an electromagnetic wave impinges on a wire screen mesh that the amount of energy absorbed is practically negligible, thus essentially the portion of the energy that isn't reflected penetrates and propagates on through the mesh. The following empirical formula has been found to generally set forth the energy penetrating an open wire square grid mesh:

$P_{pen.} = 4/k^2 \, P_{inc.}$, where
$P_{pen.}$ = energy penetrating and passing through
$P_{inc.}$ = energy incident upon the mesh
and $$k = \frac{\lambda}{(a) \log_{nat.} \left( \frac{0.83 \, e^{\frac{2\pi r}{a}}}{e^{\frac{2\pi r}{a}} - 1} \right)}$$

where
$\lambda$ = wavelength of the electromagnetic radiation
$a$ = distance between the wires in the mesh
$r$ = radius of the wires in the mesh
$\log_{nat.}$ = natural logarithm
$e$ = natural (Napierian) logarithm base In order to aid those skilled in the art in practicing this invention using an embodiment having an open wire grid partially reflecting element, the foregoing mathematical expression is set forth in nomographical form in FIG. 11.

A particular wire mesh partially reflective element and its measured characteristics are shown in FIGS. 12 and 13. The wire mesh in FIG. 12 is drawn approximately actual size. The individual wires are approximately .005 inch diameter and the spacing of the square mesh is approximately .160 inch. The measured percentage of transparency vs. the frequency of the impinging electromagnetic radiation is as shown in FIG. 13.

To further explain the operation of this invention the measured indications of the embodiment diagrammed in simplified form in FIG. 14 are shown in FIG. 15. These figures show the operating characteristics of the invention and will aid in its comprehension. It is to be understood that FIGS. 14 and 15 do not represent a calibration procedure as no calibration of the device of this invention is required when the indicator used measures frequency. The frequency separation of successive minima will be a direct correlation of the distance. When the frequency of transmission is accurately known or when a conventional frequency counter is used in connection with a conventional level indicator, the distance from the partially reflective element to the reflective object is simply the factor $c/2$ times the frequency separation between two successive minima. However, nothing is hereby implied to preclude the mechanical calibration of the invention; for instance when the frequency of transmission is not accurately determined and a cathode-ray oscilloscope type indicator is used. In such an embodiment having this construction, numerous known physical distances may be set up and the oscilloscope face directly calibrated to read the distances.

The characteristics of operation of the embodiment of the invention diagrammed schematically in FIG. 14 are shown in FIG. 15. Wire grid partially reflective element 70 was positioned at the measured distance 71 of 20 cm. from an aluminum coated wooden backed reflector 72. It was estimated that the accuracy of positioning the 20 cm. distance was +0.3 cm. The radiating source of energy of transmitter 73 was positioned so as to direct a wave in a line toward the wire grid mesh 70 and reflector 72. The frequency of transmission was varied at known frequencies over the range of approximately 8,000 mHz. to 12,500 mHz. The returning wave was received by receiver 74 and the level of the received wave indicated on level indicator 75. The plot indicating the correlation of the received signal level vs. frequency is shown in FIG. 15. The separation of successive level minima is approximately 760 mHz. Dividing this figure, 760 mHz., into the proportionality constant $c/2$ provides an indicated distance of 19.7 cm.

FIG. 9 is a block diagram of an embodiment of the invention having a cathode-ray tube indicator. In this embodiment a saw-tooth generator 101 generates a rising voltage which sweeps the horizontal scan over the face of the cathode-ray tube 102 and, simultaneously, in accord therewith, through the sweep control circuit 103, (which may be a conventional reactance tube circuit) sweeps the frequency of the transmitter oscillator 104 over a known range of incremental frequencies. The conventional frequency multiplier 105 multiplies the oscillator frequency to the desired frequency of radiation. The radio frequency power output amplifier 106 amplifies the radio frequency energy to the energy level needed for radiation into space. The magnitude of the level of this radiated energy will depend primarily upon the distance from the transmitting radiator 107 to the reflecting object 108, the reflection characteristics of the object 108, the inherent noise level, and the sensitivity of the receiving system.

Electromagnetic radiation from source 107, which is positioned in linear relationship with element 109 and object 108, partially penetrates and partially reflects from reference member 109 from which it is desired to determine the distance 110 to the reflecting object 108. The reference member 109 is a partially reflecting element as has previously been described in detail. Electromagnetic wave isolation element 111 may be used to prevent stray electromagnetic radiation from passing directly from the transmitting element 107 into the wave receiving element 112. Such isolation material is well known in the art and may consist of a grounded screen. The circuitry of the conventional receiving system comprises a radio frequency amplifier 113 feeding the mixer stage 114. Saw-tooth generator 101 in addition to controlling the sweep of the transmitted frequency and the scan of the indicator tube, also sweeps the oscillator signal fed into the mixer. The saw-tooth generator thus furnishes simultaneously, and in accord with each other, the timing reference signals, for the horizontal deflection of the cathode-ray tube beam, the frequency change, or sweep, of the transmitter oscillator, and the frequency sweep of the local oscillator in the receiver.

The returned waves, after being suitably amplified by amplifier 113, are superheterodyned in the mixer 114 with a local oscillator frequency. The local oscillator signal fed into the mixer is generated in the same manner as the transmitted signal, viz., the reactance tube sweep control circuit 115 is driven by the saw-tooth generator and sweeps the frequency of oscillator 116, and the generated oscillator signal is then multiplied by multiplier 117. In addition to the recognized difference in power level requirements of the frequency of the oscillator signal fed into the mixer from that fed to the transmitting power output amplifier, the frequency of the oscillator signal fed the mixer is slightly offset in frequency from the transmitted signal to provide a reasonable intermediate frequency (IF). The mixer output on line 118 is thus a constant IF whose amplitude changes with the strength of the returned waves. If necessary, IF amplifiers may be inserted in the receiving system between the mixer 114 and the detector stage 119. These superheterodyning techniques are quite old and very well known in the art; therefore, a detailed description is unnecessary. The IF signals are detected in detector 119 and amplified by amplifier 120 to suitably deflect the beam of cathode-ray tube 102 in the vertical direction. The vertical deflection of the cathode-ray tube is thus a measure of the detected voltage.

FIG. 10 is a pictorial representation of a typical display on the face of the cathode-ray tube— the vertical deflection being proportional to and an indication of the detector output and the horizontal deflection proportional to and an indication of the sweep of the frequencies of the transmitted energy. The beam trace thus displays and correlates the returned energy in dependence of the illuminating frequency, and since the frequency separation between two minima is an unequivocal measure of the distance between the partially reflecting element and the illuminated reflecting object, the horizontal axis of the cathode-ray tube may be directly divided into a scale of units of length.

A pictorial representation of the use of an embodiment of this invention is shown in FIG. 6. It portrays a refueling docking maneuver. In an operation of this nature, which may take place in outer space as well as in the atmosphere, it is very necessary to be able to observe closure distances, and the important distance is the distance 140 between mating flanges 141 and 142 as shown schematically in FIG. 7. It is to be noted that this is not the distance between the source of radiating energy and the reflecting object 141.

Those practicing this invention will readily understand that a desirable relation of the cross section of the partially reflective element to the cross section of the beam of radiated energy in the plane of the partially reflective element will exist when the partially reflective element is surrounded by, or in close proximity to, a relatively large reflecting surface. In these particular instances it is desirable that the beam cross section be approximately contained within the partially reflective element otherwise an undesirable strong return will be received from the reflecting surface in the vicinity of the particularly reflective element which will mask the return from the object.

It will be apparent that the methods and systems described herein may be utilized other than specifically as enumerated. For instance, in addition to distance measurements, velocity measurements may be made by observing the rate of change of the frequency difference. This may be done visually by an operator observing the changing pattern of the scope trace, or it may be obtained by a beat-tone method. In the latter method a beat-frequency oscillator signal may be injected in the detector stage 119 at FIG. 6 and a difference frequency signal between the IF signal and the beat oscillator obtained. Also closure distances may be indicated by an audio tone. In addition, the method and systems of this invention may be applied to longitudinal waves as are used in sound and sonar systems. Thus the methods and embodiments previously set forth are to be considered as illustrative and not limiting. Persons skilled in the art will make many refinements and modifications to the invention as herein described without departing from the scope of the invention as defined in the appended claims.

I claim:

1. An electromagnetic system for measuring the distance from a reference location to a reflecting object, the said system comprising: means partially reflective to electromagnetic waves; positioning means for positioning the said partially reflective means at the said reference location; electromagnetic wave radiating means having a nominal frequency of radiation for radiating a continuous wave of electromagnetic energy; means for directing the said wave of electromagnetic energy in a line toward the said reference location and the said object; electromagnetic wave receiving means for receiving electromagnetic energy and providing an output signal level responsive to the combined energy content of the reflected energy from the said partially reflective means and from the said reflecting object; frequency sweep means cooperating with the said electromagnetic wave radiating means for sweeping the frequency of the radiated wave over an incremental frequency shift to provide at least one adjacent maximum and minimum in the said output level of the said receiving means; and means cooperating with the said frequency sweep means and responsive to the said output signal level of the said receiving means for correlating the magnitude of the frequency shift of the said radiated electromagnetic energy between the said adjacent maximum and minimum output levels.

2. The distance measuring system of claim 1 wherein the incremental frequency shift of the said frequency sweep means is at least one decade removed in frequency from the said nominal frequency of radiation.

3. The distance measuring system of claim 1 wherein the said receiving means includes superheterodyning means cooperating with the said frequency sweep means.

4. The distance measuring system of claim 1 wherein the said partially reflective means is a wire grid partially reflective means.

5. The distance measuring system of claim 1 wherein the said frequency sweep means is a saw-tooth frequency sweep means.

6. The distance measuring system of claim 1 wherein the said partially reflective means provides a greater amount of energy to pass through than is reflected.

7. Distance measuring apparatus for measuring the distance from a reference location to an electromagnetic wave reflecting object comprising: electromagnetic continuous wave radiating means having a beam of electromagnetic radiation and a nominal frequency of radiation, for radiating a beam of continuous wave electromagnetic energy; means for directing the said beam of electromagnetic radiation toward the said reference location and the said object; wire mesh means partially reflective to the said beam of electromagnetic radiation energy for reflecting a portion of the energy of the said beam; positioning means for positioning the said partially reflective means at the said reference location; superheterodyne electromagnetic wave receiving means having a local oscillator for providing an output signal level responsive to the received combined energy content of the reflected energy from the said partially reflective means and from the said reflecting object; frequency sweep means cooperating with the said superheterodyne receiving means and with the said electromagnetic wave radiating means for sweeping the frequency of the local oscillator of the said receiving means, and for sweeping the frequency of the said radiated wave over an incremental frequency shift at least one decade removed in frequency magnitude from the said nominal frequency of radiation to provide at least one adjacent maximum and minimum in the said output level of the said receiving means; and indicating means cooperating with the said frequency sweep means and responsive to the said output signal level of the said receiving means for indicating the correlation of the magnitude of the frequency shift of the said radiated electromagnetic energy between the said adjacent maximum and minimum output levels.

8. The distance measuring apparatus of claim 7 wherein the said wire mesh partially reflective means is at least approximately as large in cross section as the cross section of the said radiated beam at the said reference location, and its transparency to the said beam energy is greater than its reflectivity.

References Cited

UNITED STATES PATENTS

| 2,746,034 | 5/1956 | Hasbrook | 343—15 |
| 3,243,812 | 3/1966 | Williams | 343—12 |

RODNEY D. BENNETT, *Primary Examiner.*

J. P. MORRIS, *Assistant Examiner.*